(12) United States Patent
Kim et al.

(10) Patent No.: US 10,837,669 B2
(45) Date of Patent: Nov. 17, 2020

(54) METHOD AND APPARATUS FOR EFFECTIVELY CONTROLLING PLURALITY OF INDOOR DEVICES

(71) Applicant: Samsung Electronics Co., Ltd., Suwon-si (KR)

(72) Inventors: Kyungjae Kim, Suwon-si (KR); Kwanwoo Song, Yongin-si (KR); Gunhyuk Park, Seongnam-si (KR); Jeongil Seo, Seoul (KR); Daeeun Yi, Seoul (KR); Hyejung Cho, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 16/304,920

(22) PCT Filed: Jun. 2, 2017

(86) PCT No.: PCT/KR2017/005780
§ 371 (c)(1),
(2) Date: Nov. 27, 2018

(87) PCT Pub. No.: WO2017/209559
PCT Pub. Date: Dec. 7, 2017

(65) Prior Publication Data
US 2019/0178519 A1    Jun. 13, 2019

(30) Foreign Application Priority Data

Jun. 3, 2016    (KR) .................. 10-2016-0069367

(51) Int. Cl.
*F24F 11/46*    (2018.01)
*F24F 11/62*    (2018.01)
(Continued)

(52) U.S. Cl.
CPC .............. *F24F 11/46* (2018.01); *F24F 11/62* (2018.01); *F24F 11/63* (2018.01); *G05B 19/042* (2013.01);
(Continued)

(58) Field of Classification Search
CPC .. F24F 11/46; F24F 11/62; F24F 11/63; F24F 11/58; F24F 2140/60; F24F 11/64; F24F 11/59; G05B 19/042; G05B 2219/2614
(Continued)

(56) References Cited

U.S. PATENT DOCUMENTS

2006/0191275 A1*  8/2006  Jung ..................... F24F 3/065
                                                       62/228.1
2008/0306632 A1* 12/2008  Miki ..................... F24F 3/065
                                                       700/276
(Continued)

FOREIGN PATENT DOCUMENTS

EP    1 950 507 A2    7/2008
EP    2 031 317 A2    3/2009
(Continued)

OTHER PUBLICATIONS

Extended European Search Report dated Apr. 4, 2019, issued in European Application No. 17807052.0.

*Primary Examiner* — Kenneth M Lo
*Assistant Examiner* — Michael W Choi
(74) *Attorney, Agent, or Firm* — Jefferson IP Law, LLP

(57) ABSTRACT

The present invention relates to a technology for a sensor network, machine-to-machine (M2M) communication, machine-type communication (MTC) and internet of things (IoT). The present invention can be applied in intelligent services (smart home, smart building, smart city, smart car or connected car, health care, digital education, retail business, security and safety-related services, and the like)
(Continued)

utilizing said technology. The present invention, a method for effectively controlling a plurality of indoor devices, comprises the steps of: verifying first information of first indoor devices from among a plurality of indoor devices on the basis of energy consumption of an outdoor device connected to the plurality of indoor devices; verifying second information of second indoor devices from among the plurality of indoor devices on the basis of a previously configured comfort zone; if the number of second indoor devices is greater than the number of first indoor devices on the basis of the first information and second information, then calculating the priorities of the second indoor devices, and, on the basis of the calculated priorities, operating at least one indoor device from among the second indoor devices.

17 Claims, 29 Drawing Sheets

(51) Int. Cl.
    *F24F 11/63*    (2018.01)
    *G05B 19/042*    (2006.01)
    *F24F 140/60*    (2018.01)

(52) U.S. Cl.
    CPC .. *F24F 2140/60* (2018.01); *G05B 2219/2614* (2013.01)

(58) Field of Classification Search
    USPC .......................................................... 700/276
    See application file for complete search history.

(56) References Cited

U.S. PATENT DOCUMENTS

| | | | |
|---|---|---|---|
| 2014/0345826 A1* | 11/2014 | Kim | ...................... F24F 1/0003 165/11.1 |
| 2015/0345822 A1 | 12/2015 | Steinberg et al. | |
| 2015/0354844 A1 | 12/2015 | Kates | |
| 2019/0041080 A1* | 2/2019 | Higuchi | .................. H04W 4/70 |

FOREIGN PATENT DOCUMENTS

| | | |
|---|---|---|
| EP | 2 835 594 A1 | 2/2015 |
| KR | 10-0412411 B1 | 12/2003 |
| KR | 10-0470474 B1 | 2/2005 |
| KR | 10-0554282 B1 | 2/2006 |
| KR | 10-0803572 B1 | 2/2008 |
| KR | 10-2009-0046227 A | 5/2009 |

* cited by examiner 2a (1)  2a (2)

METHOD AND APPARATUS FOR EFFECTIVELY CONTROLLING PLURALITY OF INDOOR DEVICES

TECHNICAL FIELD

The present invention relates to a method and apparatus for efficiently controlling a plurality of indoor units connected to an outdoor unit.

BACKGROUND ART

The Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies such as sensing, wired/wireless communication and network infrastructure, service interfacing and security are needed, and technologies interconnecting things such as sensor networks, machine-to-machine (M2M) or machine type communication (MTC) are under development.

In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Meanwhile, to control the temperature and humidity in a building, a plurality of indoor units located in separate interior spaces are connected to one outdoor unit for operation. When cooling the interior space, the indoor unit discharges air having a temperature lower than the indoor temperature and the outdoor unit removes heat from the interior space. When heating the interior space, the indoor unit discharges air having a temperature higher than the indoor temperature and the outdoor unit ejects air having a low temperature.

The indoor units located in separate interior spaces are individually controlled, and such control is performed without considering the energy efficiency of the outdoor unit, lowering the energy efficiency of the outdoor unit. Since the indoor units are located in separate interior spaces with different heat change rates and have different cooling/heating capacities, it is difficult to efficiently control the indoor units in a coordinated way. In addition, when efficient operation is attempted by controlling a plurality of indoor units in a coordinated way, it is difficult to perform efficient scheduling because the high efficiency range of each outdoor unit is different.

DISCLOSURE OF INVENTION

Technical Problem

Accordingly, an aspect of the present invention is to provide a method and apparatus that can operate the outdoor unit and indoor units in a highly energy-efficient manner by identifying the high efficiency range of the outdoor unit and operating the indoor units according to the high efficiency range and the state of the outdoor unit.

Solution to Problem

In accordance with an aspect of the present invention, there is provided a method for controlling a plurality of indoor units. The method may include: identifying first information of first indoor units among the plurality of indoor units based on energy consumption of an outdoor unit connected with the plurality of indoor units; identifying second information of second indoor units among the plurality of indoor units based on a preset comfort zone; and calculating, if the number of the second indoor units is greater than the number of the first indoor units, the priorities of the second indoor units based on the first information and the second information, and operating at least one indoor unit among the second indoor units based on the calculated priorities.

In one embodiment, the method may further include operating all the second indoor units based on the first information and the second information if the number of the second indoor units is less than or equal to the number of the first indoor units.

In one embodiment, the method may further include: recalculating the priorities of the second indoor units after the at least one indoor unit is operated; and operating, if the priorities of the second indoor units are changed as a result of priority recalculation, at least one indoor unit among the second indoor units based on the recalculated priorities.

In one embodiment, the priority of a second indoor unit located in a specific interior space may be calculated based on the ratio of the time during which the indoor temperature of the interior space is maintained between a preset first temperature and a preset second temperature to a given measurement time duration.

In another embodiment, the priority of a second indoor unit located in a specific interior space may be calculated based on the thermal efficiency of the interior space.

In one embodiment, identifying second information of second indoor units may include determining that a specific indoor unit located in an interior space is one of the second indoor units if the indoor temperature of the interior space does not deviate from the comfort zone between a preset first temperature and a preset second temperature after a preset delay time.

In one embodiment, the number of the first indoor units is determined based on energy consumption of the outdoor unit relative to the indoor temperature change rate calculated at a specific outdoor air temperature.

In one embodiment, the method may further include storing the air conditioning operation time and indoor temperature data of each interior space.

In accordance with another aspect of the present invention, there is provided a control device capable of controlling a plurality of indoor units. The control device may include: a transceiver configured to transmit and receive a control signal and measurement data; a controller configured to control identifying first information of first indoor units among the plurality of indoor units based on energy consumption of an outdoor unit connected with the plurality of indoor units, identifying second information of second indoor units among the plurality of indoor units based on a preset comfort zone, and calculating, if the number of the second indoor units is greater than the number of the first indoor units, the priorities of the second indoor units based on the first information and the second information and operating at least one indoor unit among the second indoor units based on the calculated priorities; and a storage configured to store the measurement data and the priorities.

Advantageous Effects of Invention

In a feature of the present invention, there is provided a method for efficiently controlling a plurality of indoor units. The method may control multiple indoor units in an efficient manner so that energy can be efficiently used for cooling and heating.

MODE FOR THE INVENTION

Figure 1:
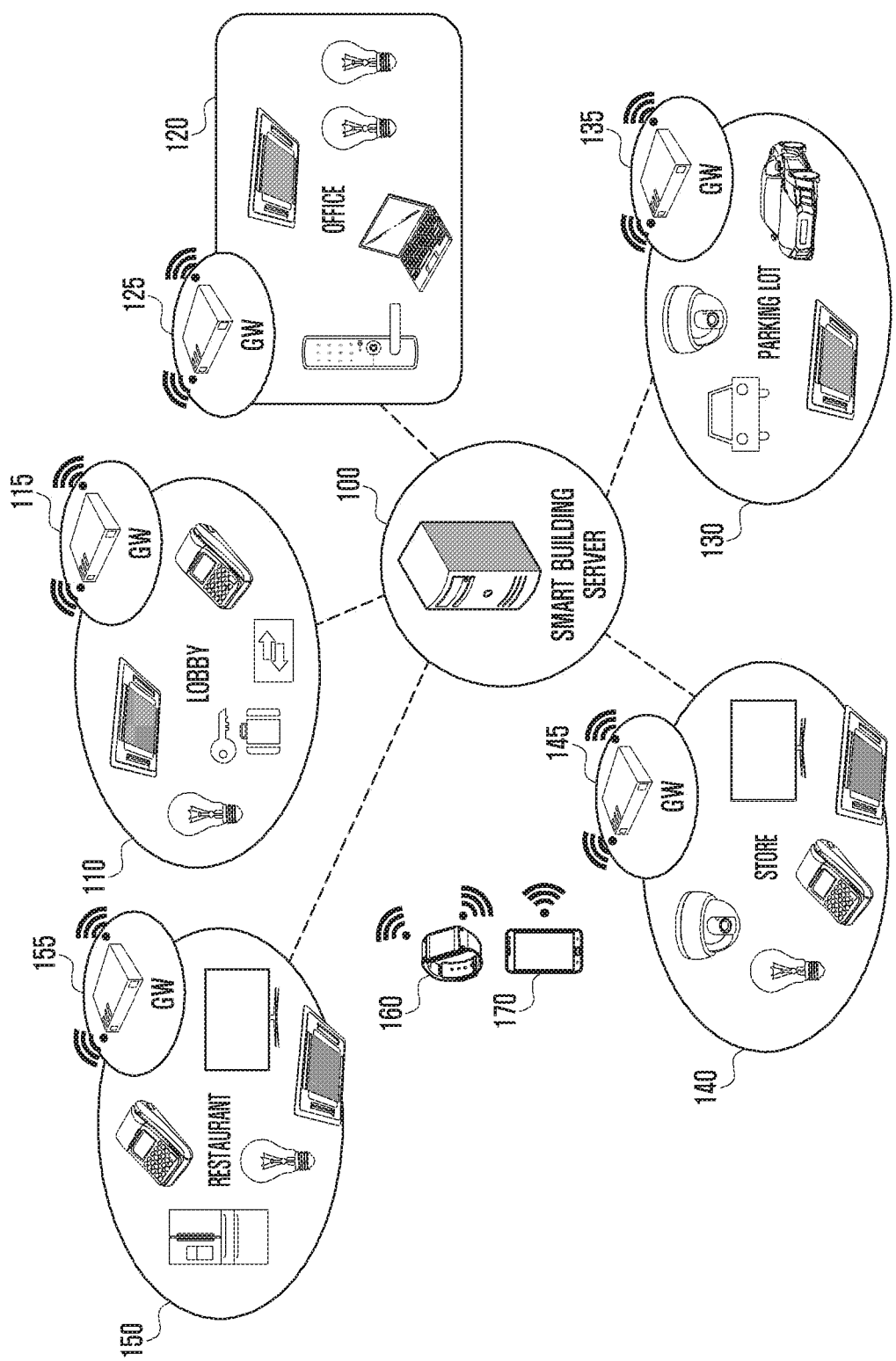
FIG. 1 illustrates a system including a smart building server and a gateway according to an embodiment of the present invention.

Hereinafter, embodiments of the present invention are described in detail with reference to the accompanying drawings.

Descriptions of functions and structures well known in the art and not directly related to the present invention may be omitted for clarity and conciseness without obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

The terminology used in the following description is provided to aid understanding of the present invention, and such terminology can be used in different forms without departing from the spirit of the present invention.

FIG. 1 illustrates a system including a smart building server and a gateway according to an embodiment of the present invention.

With reference to FIG. 1, the smart building server 100 can communicate with a gateway and a user located in each space in the building. For example, the gateway 115 located in the lobby 110 may communicate with the smart building server 100 and can transmit and receive signals to and from the unmanned locker, the indoor unit, and the lighting in the lobby. In this case, the smart building server 100 can control the devices located in the lobby through the gateway 115. The smart building server 100 can communicate with the gateway 125 located in the office 120 to control the lighting, the indoor unit and the like located in the office 120. The smart building server 100 can communicate with the gateway 135 located in the parking lot 130 to control the surveillance camera (CCTV), the fare adjuster, and the like. The smart building server 100 can communicate with the gateway 145 located in the shop 140 to control the display, the lighting, the indoor unit, and the like. The smart building server 100 can communicate with the gateway 155 located in the restaurant 150 to control the display, the refrigerator, the lighting, and the indoor unit. The smart building server 100 may also transmit and receive signals to and from a wearable device 160 and/or a smart device 170 of a user.

Such a wearable device or smart device can transmit and receive signals to and from the devices located in each interior space. Although FIG. 1 shows a case in which separate gateways are present to control other devices, a specific device located at a given location may act as a gateway without a physical gateway and may control other devices and transmit and receive signals to and from the smart building server.

Figure 2A:
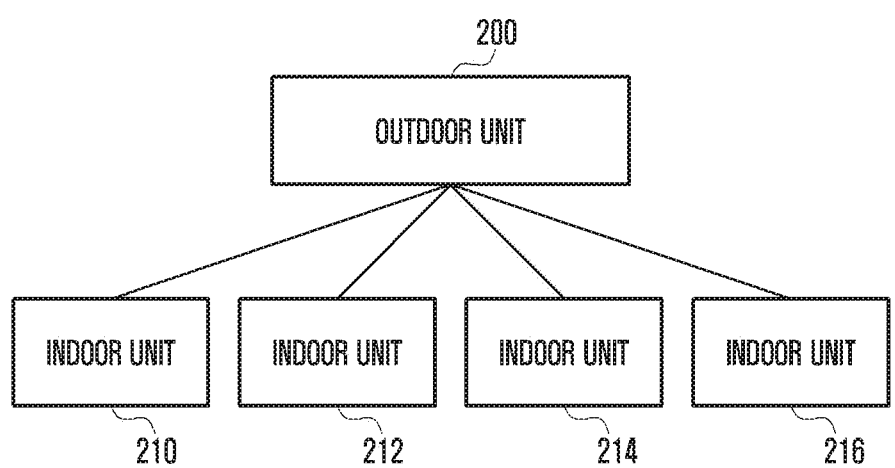
FIG. 2A shows the architecture of an outdoor unit and indoor units and depicts the indoor temperature changing with operation of an indoor unit.
Figure 2A:
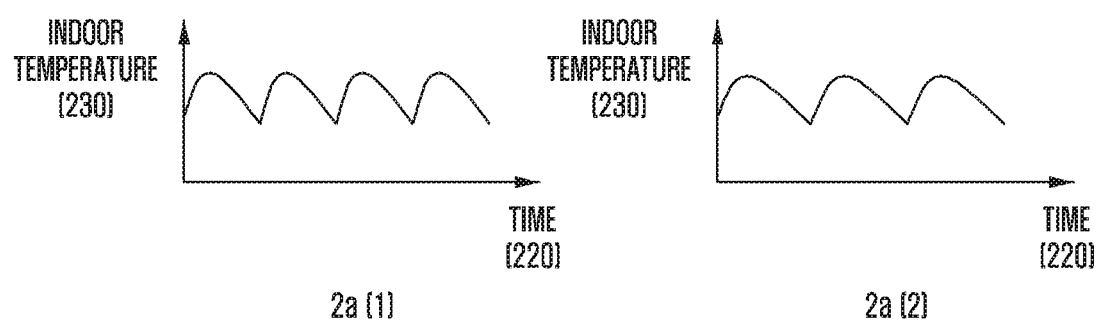

FIG. 2A shows the architecture of an outdoor unit and indoor units and depicts the indoor temperature changing with operation of an indoor unit.

With reference to FIG. 2A, one outdoor unit 200 is connected to a plurality of indoor units. Here, the outdoor unit 200 is connected to the first indoor unit 210, the second indoor unit 212, the third indoor unit 214 and the fourth indoor unit 216, which are located in separate interior spaces. A plurality of indoor units can also be located in one interior space.

In FIG. 2A, part (1) shows the indoor temperature 230 varying with time 220 according to the operation of the first indoor unit, and part (2) shows the indoor temperature 230 varying with time 220 according to the operation of the third indoor unit. Since the first indoor unit and the third indoor unit have different cooling capacities and the interior spaces have different indoor temperature change rates per cooling energy, different indoor temperature changes are shown as in parts (1) and (2).

Figure 2B:
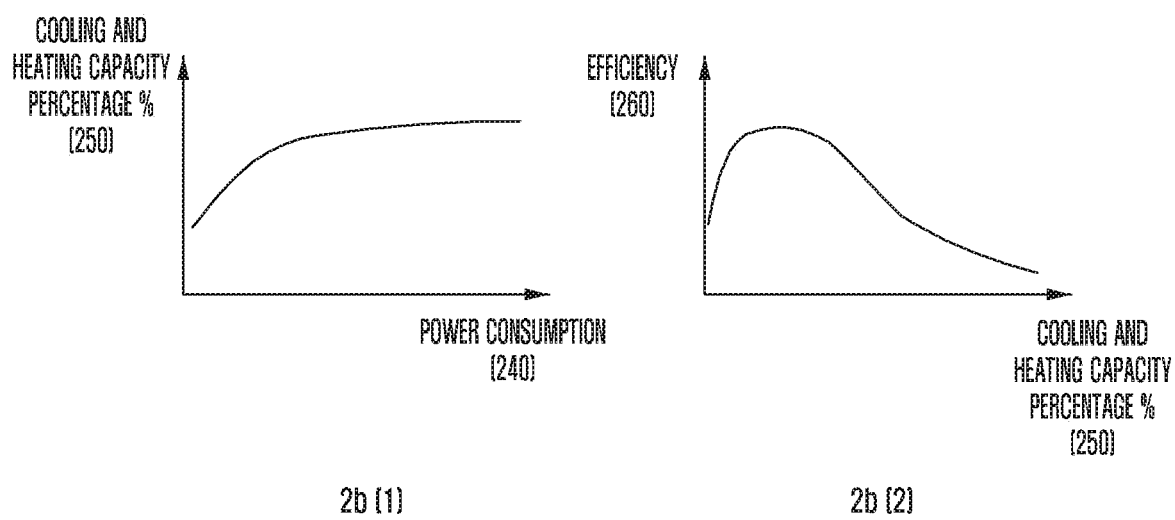
FIG. 2B depicts the efficiency of the outdoor unit.

FIG. 2B depicts the efficiency of the outdoor unit.

With reference to FIG. 2B, when the maximum energy that can be generated by the outdoor unit is 100 percent (%), the cooling/heating energy generated by the outdoor unit is controlled in the range of 0 to 100 percent, and this ratio is adjusted according to the request of the indoor units. Since the cooling/heating energy generated by the outdoor unit is not proportional to the amount of power consumed by the outdoor unit, the efficiency varies depending on the ratio of the cooling/heating energy generated by the outdoor unit. In FIG. 2B, part (1) shows the ratio of the cooling/heating energy (250) to the power consumed by the outdoor unit (240). Here, the ratio of the cooling/heating energy generated by the outdoor unit is referred to as the cooling and heating capacity percentage. Part (2) of FIG. 2B shows the cooling/heating efficiency (260) (hereinafter, referred to as efficiency) relative to the cooling and heating capacity percentage (250) of the outdoor unit. Here, the efficiency is the cooling and heating capacity percentage divided by the power consumed by the outdoor unit, and may correspond to the cooling and heating capacity percentage relative to the power consumption of the outdoor unit. The efficiency is proportional to the indoor temperature change rate per power consumption, and the cooling and heating capacity percentage is proportional to the number of indoor units in operation.

In this case, a description is given of a method of extracting a high efficiency range of the outdoor unit.

Figure 3A:
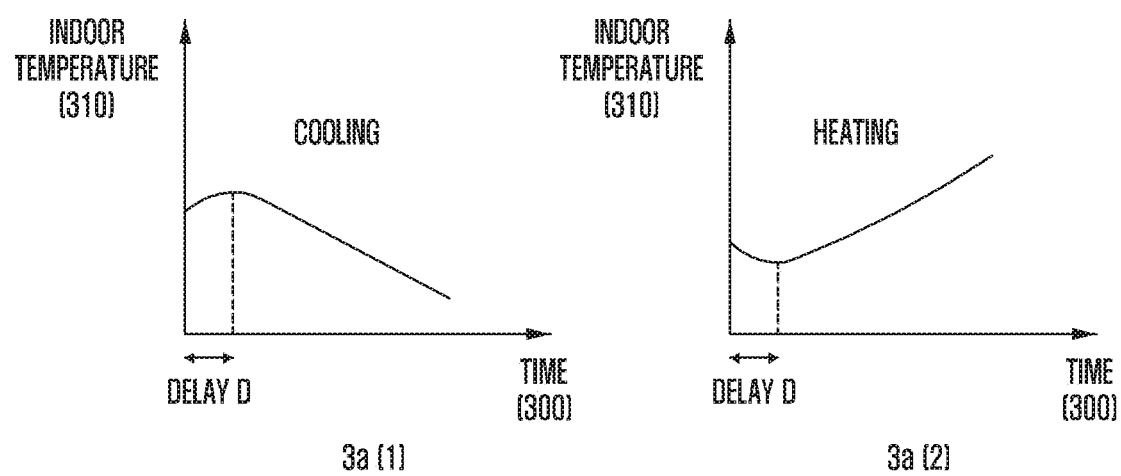
FIG. 3A depicts the indoor temperature changing with time when the indoor unit performs cooling or heating.

The high efficiency range is a range with a high indoor temperature change rate when the indoor temperature change rate relative to the unit power consumption is extracted at a specific outdoor temperature, and this data may be obtained on the basis of indoor temperature data and power consumption data at specific outdoor temperatures stored in the database. Here, the indoor temperature change rate is calculated using the data collected after the delay time d, which is the time required for the indoor temperature to reflect the cooling/heating effect, as shown in FIG. 3A. FIG. 3A shows the indoor temperature 310 changing with time 300 when the indoor unit performs cooling or heating, where the indoor unit performs cooling in part (1) and performs heating in part (2). It can be seen from part (1) that the indoor temperature gradually decreases after the delay time d from the time when the indoor unit starts cooling, and it can be seen from part (2) that the indoor temperature gradually increases after the delay time d from the time when the indoor unit starts heating.

Figure 3B:
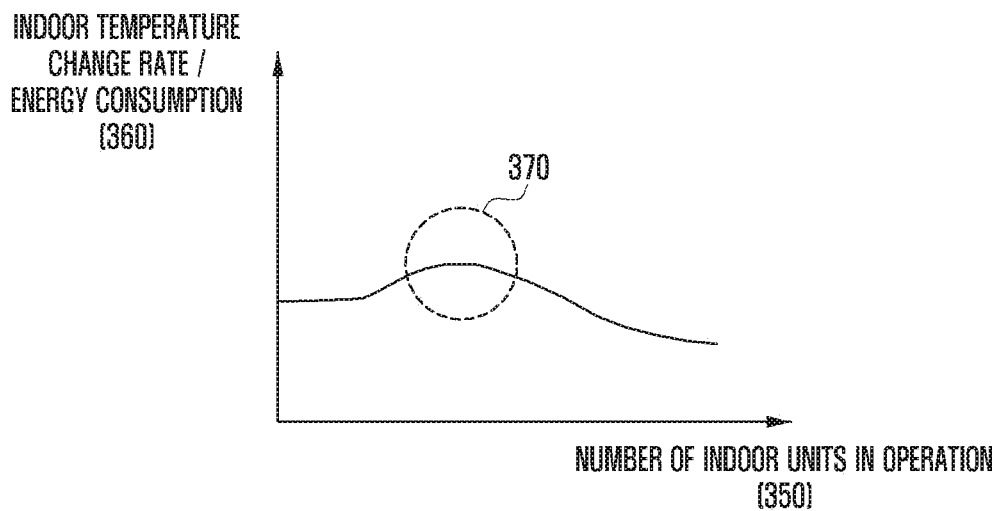
FIG. 3B illustrates the high efficiency range of the outdoor unit at a specific outdoor temperature.

FIG. 3B illustrates the high efficiency range of the outdoor unit at a specific outdoor temperature. The efficiency of the outdoor unit is determined by the indoor temperature change rate ($\Delta T$) divided by the amount of energy consumption (EC) ($\Delta T/EC$, 360) relative to the number of indoor units in operation (350) for cooling or heating (this may be a combination of indoor unit air volumes or the difference between the indoor temperature and the set temperature). Here, the range indicated by reference numeral 370 with a high indoor temperature change rate per energy consumption may be referred to as the high efficiency range of the outdoor unit. In addition, when the indoor temperature change rate per energy consumption is greater than or equal to a preset threshold, the number of indoor units in operation can be referred to as the high efficiency range of the outdoor unit. Since the indoor units repeat cooling or heating operation to maintain a constant temperature, it is not difficult to extract the high efficiency range data for a fixed outdoor air temperature.

Next, a description is given of the parameters defined for efficient scheduling of indoor units.

Figure 4:
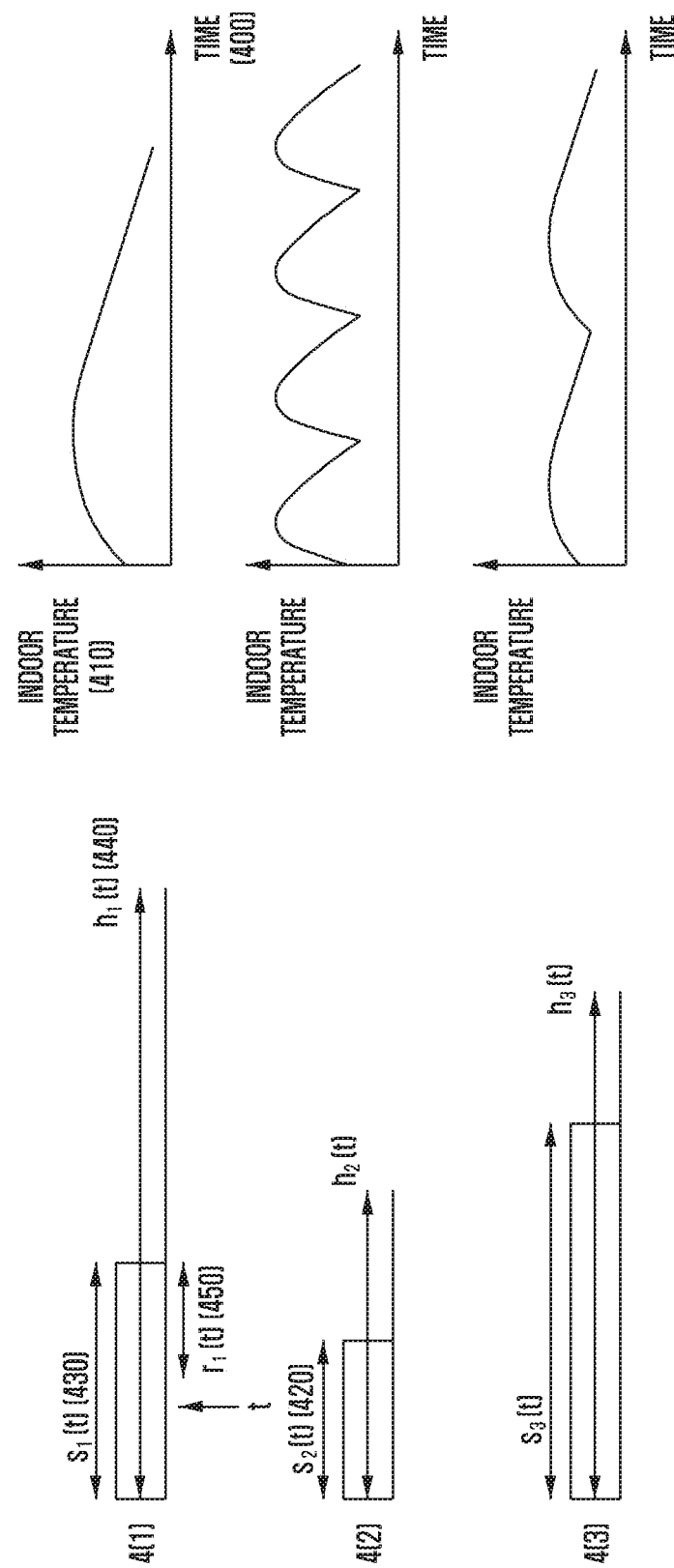
FIG. 4 illustrates the parameters extracted from the operation of the indoor units and the outdoor unit.

FIG. 4 illustrates the parameters extracted from the operation of the indoor units and the outdoor unit.

In FIG. 4, part (1) depicts the operation of the indoor unit in the first space, part (2) depicts the operation of the indoor unit in the second space, and part (3) depicts the operation of the indoor unit in the third space. Here, t denotes the current time, and $h_i(t)$ denotes the end time of the $i^{th}$ space period at time t. The space period means the duration from the time when cooling or heating is started in a specific space to the time when cooling or heating is required, and the indoor unit should start cooling or heating after $h_i(t)$ ends. In addition, $s_i(t)$ denotes the minimum required operation time in the $i^{th}$ space period at time t, and $r_i(t)$ denotes the remaining operation time in the $i^{th}$ space period at time t. As shown in part (1) of FIG. 4, reference numeral 420 indicates the current time t, reference numeral 440 indicates the first space period $h_1(t)$, reference numeral 430 indicates the minimum required operation time $s_1(t)$ of the first space, and reference numeral 450 indicates the remaining operation time $r_1(t)$.

These parameters can be extracted from the data about the indoor temperature changing with time. Since the indoor unit repeatedly performs cooling or heating, these parameters can be obtained using the indoor temperature change data and the air conditioning operation time data accumulated over time.

In addition, these parameters may vary according to the characteristics of each indoor unit located in a specific space such as the cooling and heating capacity and the deterioration level of the indoor unit, and the characteristics of each space such as the heat generation level of the space, the volume of the space, and the location of the space in the building. For example, as can be seen in FIG. 4, the parameters for the first to third spaces are different, and these parameters can be updated over time.

Figure 5:
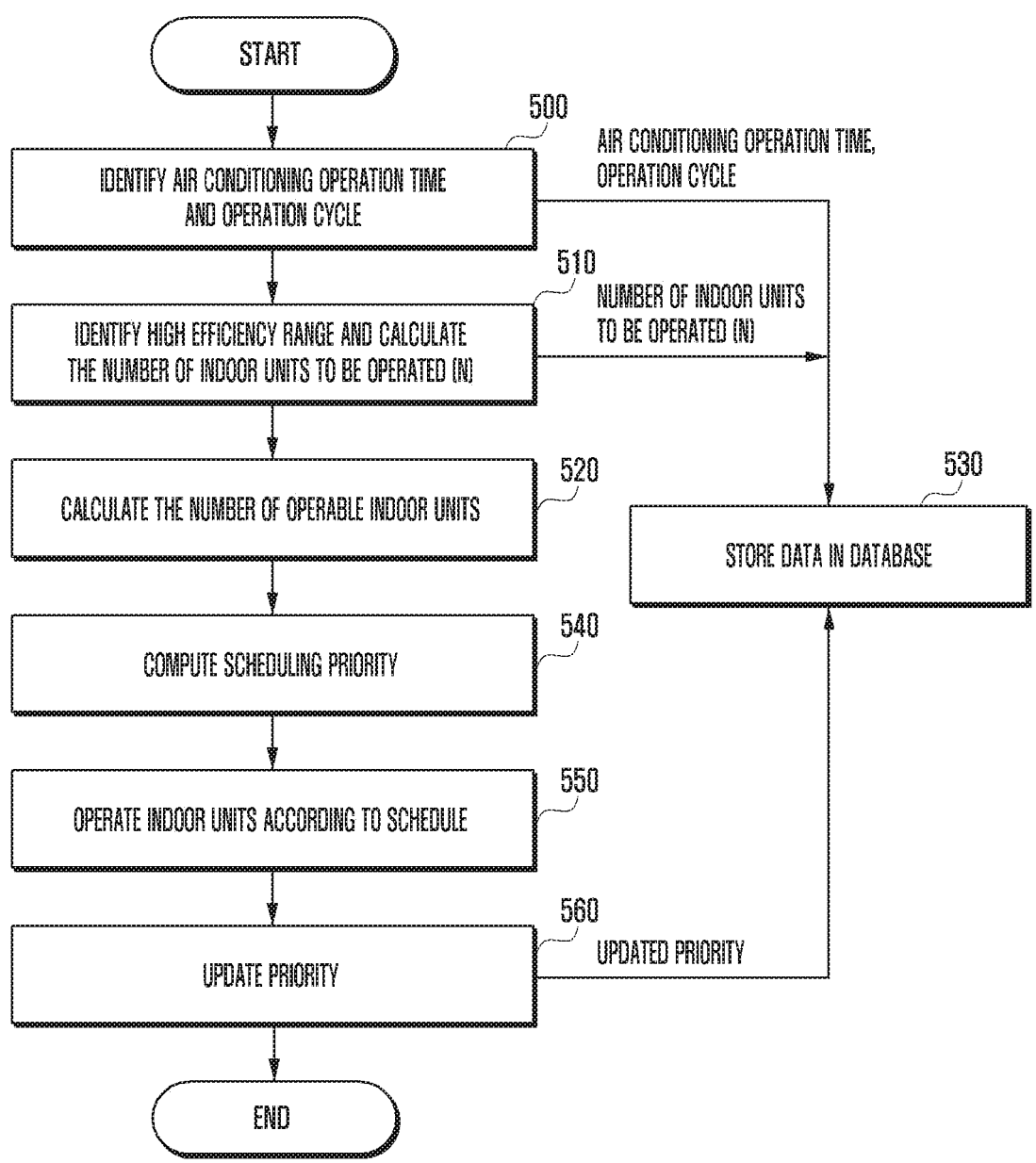
FIG. 5 is a flowchart of a method according to the present invention.

FIG. 5 is a flowchart of a method according to the present invention.

With reference to FIG. 5, the air conditioning operation time and the operation cycle for each space at a specific outdoor air temperature are extracted from the data stored in the database (500). The number of operable indoor units and the efficiency of the outdoor unit are calculated for the outdoor air temperature, and the number of indoor units to be operated (n) is calculated when the outdoor unit is in the high efficiency range (510). In the description, "the number of indoor units to be operated" may be used interchangeably with "the number of first indoor units".

In one embodiment, the number of first indoor units may be determined according to a result of checking the first information about the first indoor units among the plurality of indoor units. The first information may be determined based on energy consumption of the outdoor unit connected to the plurality of indoor units.

Here, the number of the first indoor units may be determined based on the energy consumption of the outdoor unit relative to the indoor temperature change rate calculated at a specific outdoor air temperature.

Thereafter, the number of operable indoor units can be calculated (520). In the description, "the number of operable indoor units" may be used interchangeably with "the number of second indoor units whose start times can be changed".

In one embodiment, the number of second indoor units may be determined according to a result of checking the second information about the second indoor units among the plurality of indoor units. The second information may be determined based on the preset comfort zone.

Here, if the current temperature in a given interior space where a specific indoor unit is located does not deviate from the comfort zone between a preset first temperature and a preset second temperature after a preset delay time, the specific indoor unit may be determined to be one of the second indoor units.

In another embodiment, the comfort zone may be set between a preset first humidity and a preset second humidity in addition to the first temperature and the second temperature.

The scheduling priorities (referred to as priorities) of the operable indoor units are calculated (530). The operable indoor units are operated according to the schedule determined based on the calculated priorities and the number of indoor units to be operated n (550). The priority of each indoor unit is newly calculated according to the indoor temperature after operation and updated (560). Here, the air conditioning operation time and the operation cycle obtained at step 500, the number of indoor units to be operated n calculated at step 510, and the priority updated at step 560 are stored in the database (570).

Such extraction and calculation can be performed by the controller of the smart building server or the controller of the outdoor unit, and the database can be present in the storage of the smart building server or the storage of the outdoor unit.

Next, each step of the method of the present invention is described in detail.

Figure 6A:
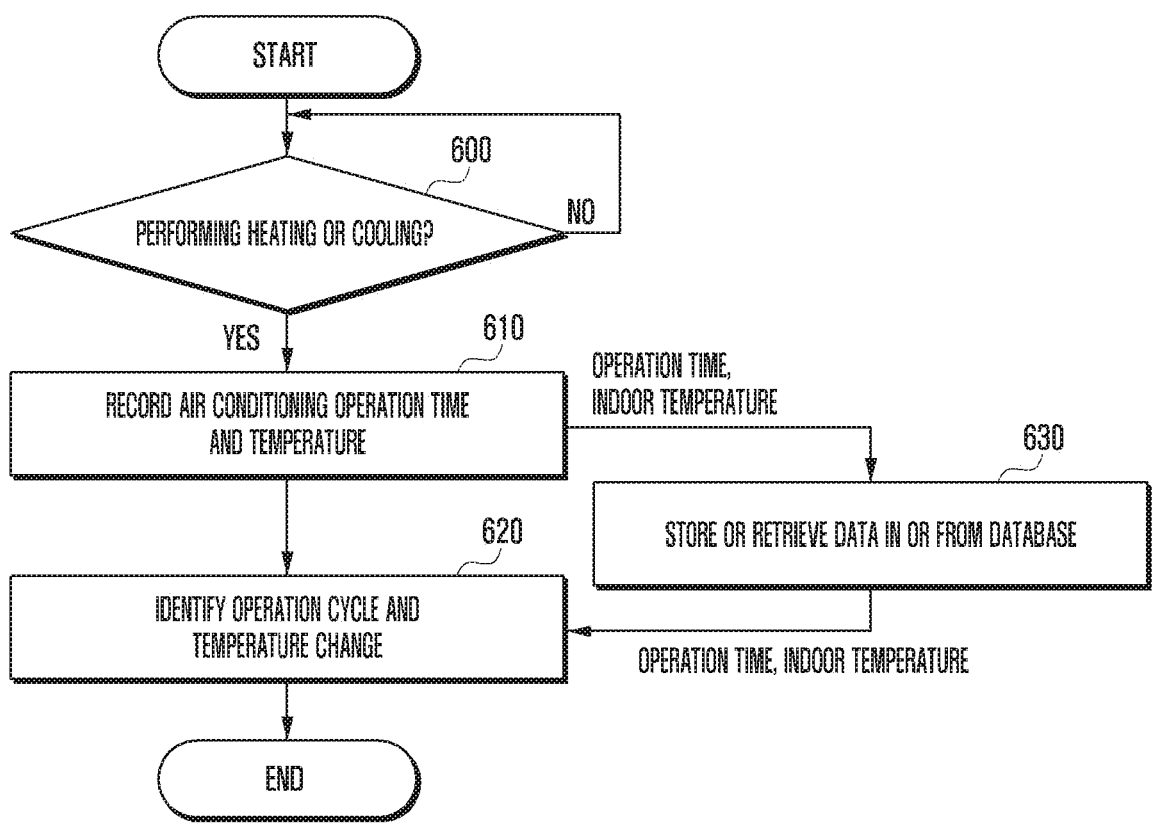
FIG. 6A illustrates a method for retrieving the air conditioning operation time and the operation cycle.

First, a description is given of obtaining the air conditioning operation time and the operation cycle. FIG. 6A illustrates a method for retrieving the air conditioning operation time and the operation cycle. With reference to FIG. 6A, the controller determines whether the indoor unit is currently performing heating or cooling (600). If so, the controller records the air conditioning operation time and the indoor temperature (610). Here, the operation time and the indoor temperature data are stored in the database (630). Thereafter, based on the above data, the controller identifies the operation cycle and the temperature change due to the operation time (640).

Figure 6B:
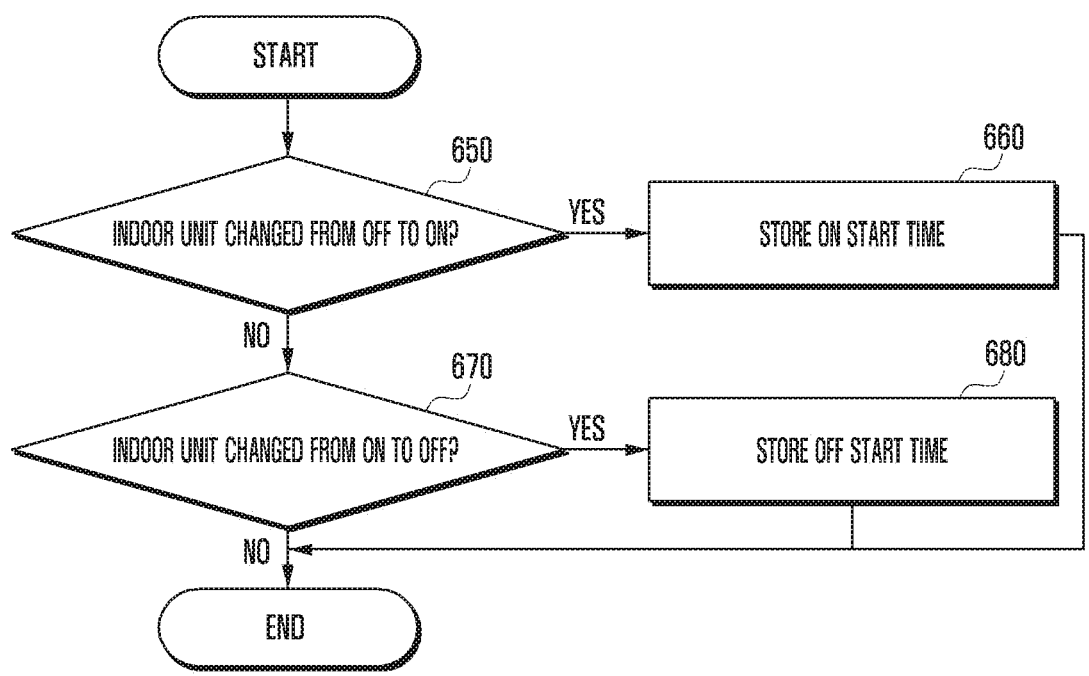
FIG. 6B illustrates a method for storing the air conditioning operation time in particular.

FIG. 6B illustrates a method for storing the air conditioning operation time in particular. With reference to FIG. 6B, the controller determines whether the state of the indoor unit has changed from the air conditioning off-state to the on-state (650). If so, the controller stores the time when the state has transitioned to the on-state (660). Otherwise, the controller determines whether the state of the indoor unit has changed from the air conditioning on-state to the off-state (670). If so, the controller stores the time when the state has transitioned to the off-state (680).

Figure 7A:
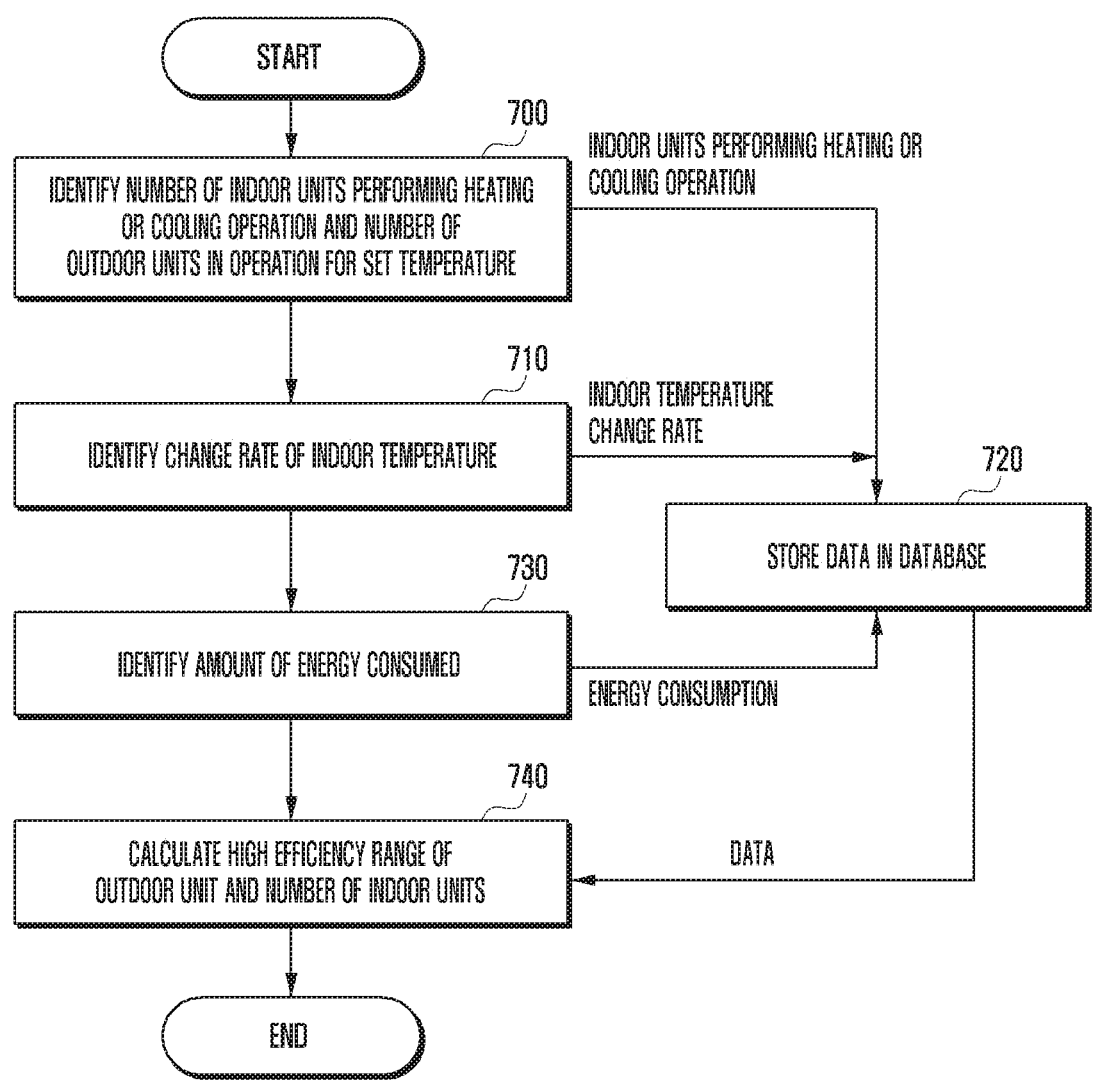
FIG. 7A illustrates a method for retrieving the high efficiency range of the outdoor unit and calculating the number of indoor units to be operated (n).

Second, a description is given of identifying the high efficiency range of the outdoor unit and calculating the number of indoor units to be operated (n). FIG. 7A illustrates a method for retrieving the high efficiency range of the outdoor unit and calculating the number of indoor units to be operated (n). With reference to FIG. 7A, the controller identifies the number of indoor units performing heating or cooling operation and the number of outdoor units in operation for a given temperature (700), identifies the change rate of the indoor temperature (710), identifies the amount of energy consumed by the outdoor unit (730), stores the information about the indoor units in operation, the indoor temperature change rate, and the energy consumption of the outdoor unit in the database (720), and calculates the high efficiency range of the outdoor unit and the number of indoor units to be operated (n) based on the data stored in the database (740).

Here, the value of n is calculated in consideration of the number of outdoor units in operation and the set temperature of the indoor units connected thereto. For example, when one outdoor unit is in operation and the set temperature for the indoor unit is 23 degrees Celsius, if the number of indoor units performing cooling is 12, this may belong to the high efficiency range. As another example, when two outdoor units are in operation, if the number of indoor units performing cooling for a set temperature of 20 degrees is 19 and the number of indoor units performing heating for a set temperature of 27 degrees is 5, this may belong to the high efficiency range. As another example, when two outdoor units are in operation, if the number of indoor units performing cooling for a set temperature of 24 degrees is 27, this may belong to the high efficiency range.

Figure 7B:
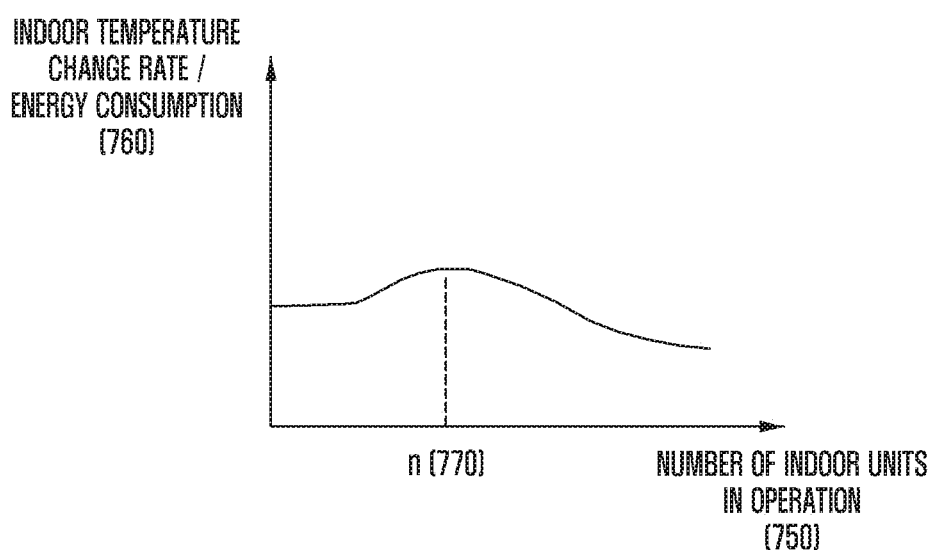
FIG. 7B illustrates the high efficiency range of the outdoor unit at a specific outdoor temperature.

FIG. 7B illustrates the high efficiency range of the outdoor unit at a specific outdoor temperature. The controller calculates the indoor temperature change rate per energy consumption of the outdoor unit (760) relative to the number of indoor units in operation (750) at a specific outdoor air temperature, and determines the number of indoor units in operation when the indoor temperature change rate per energy consumption of the outdoor unit is the highest as the number of indoor units to be operated (n) (770).

Figure 8:
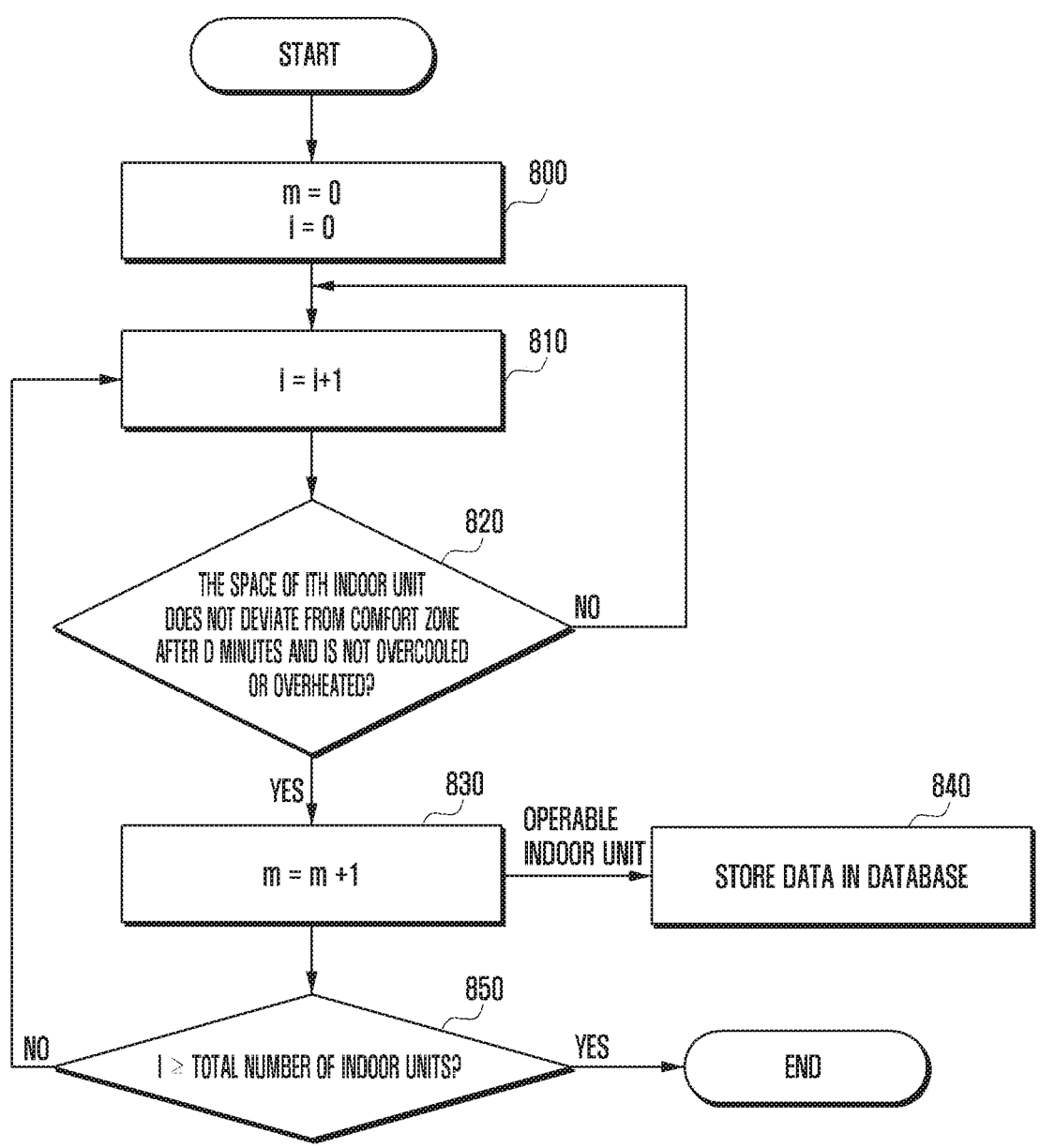
FIG. 8 illustrates a method for calculating the number of operable indoor units.

Third, a description is given of identifying the number of operable indoor units. FIG. 8 illustrates a method for calculating the number of operable indoor units. Here, an operable indoor unit refers to an indoor unit that can be operated at a desired time. As the interior space must be kept comfortable even if the air conditioning time and/or cycle is changed for efficient indoor unit operation, the indoor unit that should be operated now does not belong to the operable indoor units. The comfort of the interior space may mean that the environment of the interior space is maintained within a preset range of temperature, humidity, and the like.

With reference to FIG. 8, the controller sets m (the number of operable indoor units) to 0 and sets i (the index of the current indoor unit) to 0 (800). Thereafter, the controller increments i by 1 (810) and determines whether the space where the $i^{th}$ indoor unit is located does not deviate from the comfort zone after d minutes (d denotes the delay time in FIG. 3A) and is not in the overcooling or overheating state (820). If the space deviates from the comfort zone or in the overcooling or overheating state, the $i^{th}$ indoor unit is not included in the operable indoor units since it must be operated immediately so as to prevent the corresponding space from exceeding the comfort zone, so the procedure returns to step 810. If the space does not deviate from the comfort zone or is not in the overcooling or overheating state, as the $i^{th}$ indoor unit is included in the operable indoor units, the controller increments m by 1 (830) and stores the information on the operable indoor unit in the database (840). Thereafter, the controller determines whether i is greater than or equal to the total number of indoor units (850). If so, the procedure ends. Otherwise, the procedure returns to step 810.

In one embodiment, the comfort zone at step 820 may be configured between a first temperature and a second temperature set in advance. Here, in the interior space where a specific indoor unit is located, if the current temperature does not deviate from the comfort zone between the first temperature and the second temperature after a preset delay time, the indoor unit can be determined to be an operable indoor unit.

In another embodiment, the comfort zone at step 820 may be configured between a first temperature and a second temperature set in advance and between a first humidity and a second humidity set in advance. Here, in the interior space where a specific indoor unit is located, if the current temperature and the current humidity do not deviate from the comfort zone after a preset delay time, the indoor unit can be determined to be an operable indoor unit.

In another embodiment, the comfort zone at step 820 may be calculated based on the Predicted Mean Vote (PMV), which can be referenced to ISO 7730 or ASHRAE standards. The PMV predicts the average value of a plurality of people's responses about their thermal sensation on a seven-point scale.

For example, the comfort zone described above may mean that the value of PMV satisfies −0.5<PMV<0.5, the overcooling state may mean a case where PMV<0 when the indoor unit performs cooling, and the overheating state may mean a case where PMV>0 when the indoor unit performs heating. Refer to Table 1 below for the meaning of PMV values.

TABLE 1

| PMV값 | 의미 |
|---|---|
| +3 | Hot |
| +2 | Warm |
| +1 | Slightly Warm |
| 0 | Neutral |
| −1 | Slightly Cool |
| −2 | Cool |
| −3 | Cold |

Fourth, a description is given of calculating the priority of operable indoor units.

As a first scheme for priority calculation, a description is given of calculating the priority based on the distance (temperature difference) between the current temperature and the boundary of the comfort zone. In this scheme, the priority is calculated based on the distance between the current temperature and the boundary of the comfort zone, and the priority is given in order of distance between the current temperature and the boundary of the comfort zone. For cooling, the distance from the current temperature to the upper boundary of the comfort zone (i.e., higher temperature) is used; and for heating, the distance from the current temperature to the lower boundary of the comfort zone (i.e., lower temperature) is used. This scheme calculates the priority using the temperature difference between the current temperature and the comfort zone. Thus, when the distance is short (that is, when there is a small difference in temperature before deviating from the comfort zone), a high priority is assigned because cooling or heating is required urgently.

Figure 9A:
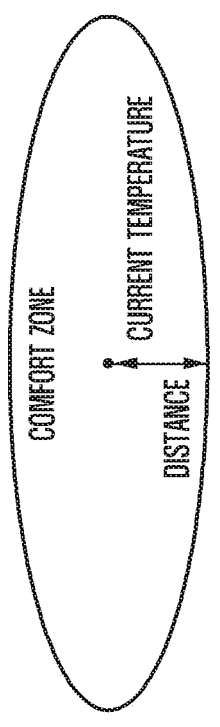
FIG. 9A depicts the distance (temperature difference) between the current temperature and the boundary of the comfort zone.
Figure 9A:
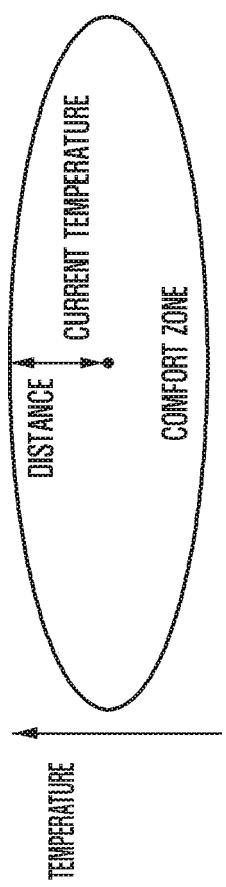

FIG. 9A depicts the distance (temperature difference) between the current temperature and the boundary of the comfort zone. Part (1) of FIG. 9A shows a case of cooling. Since the outdoor temperature is higher than the upper boundary of the comfort zone, the current temperature (indoor temperature) is lowered through cooling. In this case, the distance to the upper boundary of the comfort zone is a temperature range in which the user can feel comfortable. If this distance is short, cooling is urgently needed. Part (2) of FIG. 9A shows a case of heating. Since the outdoor temperature is lower than the lower boundary of the comfort zone, the current temperature (indoor temperature) is raised through heating. In this case, the distance to the lower boundary of the comfort zone is a temperature range in which the user can feel comfortable. If this distance is short, heating is urgently needed.

Figure 9B:
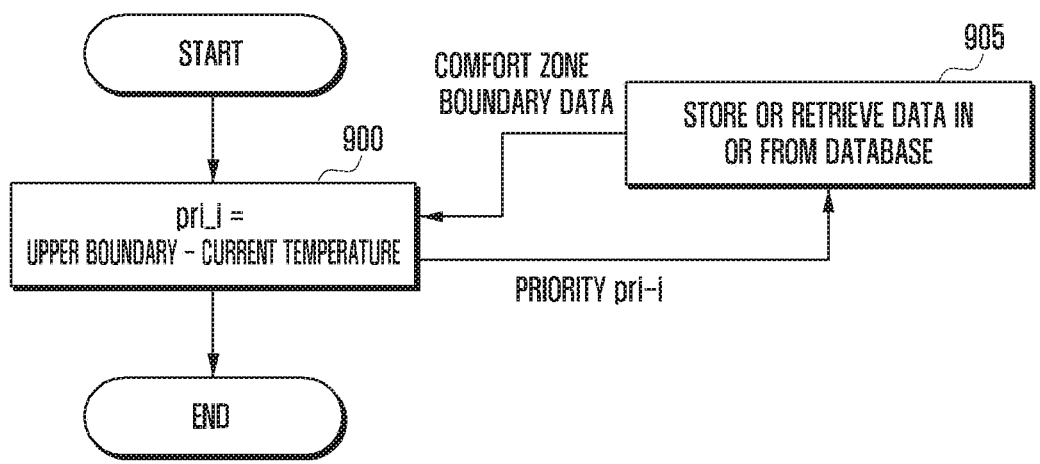
FIG. 9B illustrates a method of calculating the priority using the first scheme for cooling.

FIG. 9B illustrates a method of calculating the priority using the first scheme for cooling. With reference to FIG. 9B, the priority pri_i is calculated by the temperature at the upper boundary of the comfort zone–(minus) the current temperature (900). Here, the comfort zone boundary data is retrieved from the database and is used for the calculation, and the calculated priority pri_i is stored in the database (905).

Figure 9C:
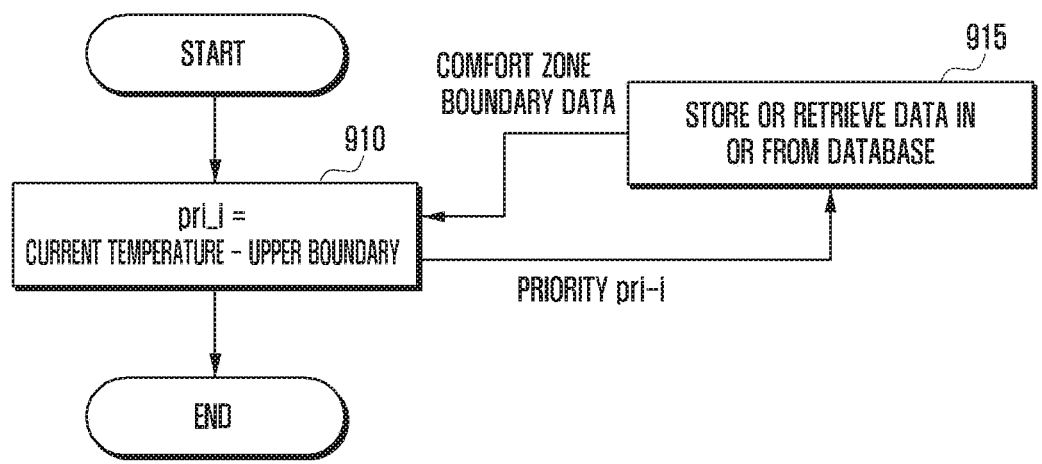
FIG. 9C illustrates a method of calculating the priority using the first scheme for heating.

FIG. 9C illustrates a method of calculating the priority using the first scheme for heating. With reference to FIG. 9C, the priority pri_i is calculated by the current temperature–(minus) the temperature at the lower boundary of the comfort zone (910). Here, the comfort zone boundary data is retrieved from the database and is used for the calculation, and the calculated priority pri_i is stored in the database (915).

As a second scheme for priority calculation, a description is given of calculating the priority based on the time taken for the indoor temperature to change from the current temperature to the boundary of the comfort zone when the indoor unit is not operated. In this scheme, the priority is given in order of time taken for the indoor temperature to change from the current temperature to the boundary of the comfort zone when the indoor unit is not operated. For cooling, the distance from the current temperature to the upper boundary of the comfort zone (i.e., higher temperature) is used; and for heating, the distance from the current temperature to the lower boundary of the comfort zone (i.e., lower temperature) is used. This scheme calculates the priority using the time taken for the indoor temperature to deviate from the comfort zone. If the time is short (that is, if it does not become comfortable immediately), a high priority is assigned because cooling or heating is required urgently.

Figure 9D:
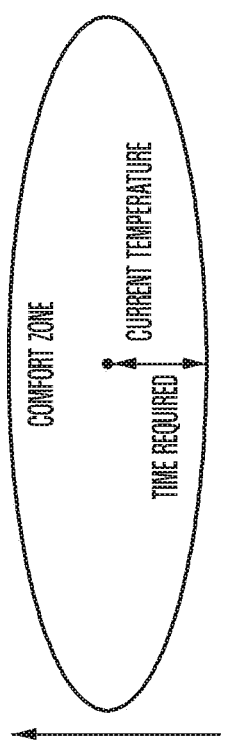
FIG. 9D shows the time taken from the current temperature to the boundary of the comfort zone.
Figure 9D:
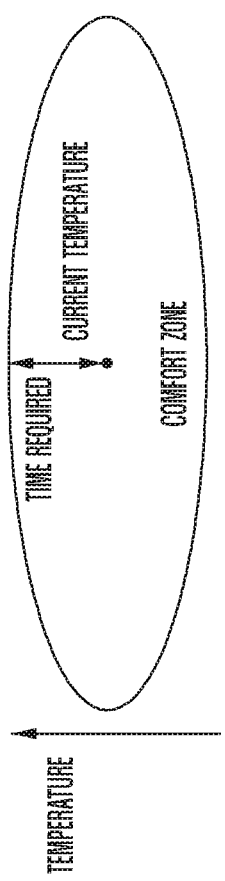

FIG. 9D shows the time taken from the current temperature to the boundary of the comfort zone. Part (1) of FIG. 9D shows a case of cooling. Since the outdoor temperature is higher than the upper boundary of the comfort zone, the current temperature (indoor temperature) is lowered through cooling. In this case, the time taken for the indoor temperature to change to the upper boundary of the comfort zone is the duration where the user can feel comfortable. If this time is short, cooling is urgently needed. Part (2) of FIG. 9D shows a case of heating. Since the outdoor temperature is lower than the lower boundary of the comfort zone, the current temperature (indoor temperature) is raised through heating. In this case, the time taken for the indoor temperature to change to the lower boundary of the comfort zone is the duration where the user can feel comfortable. If this time is short, heating is urgently needed.

Figure 9E:
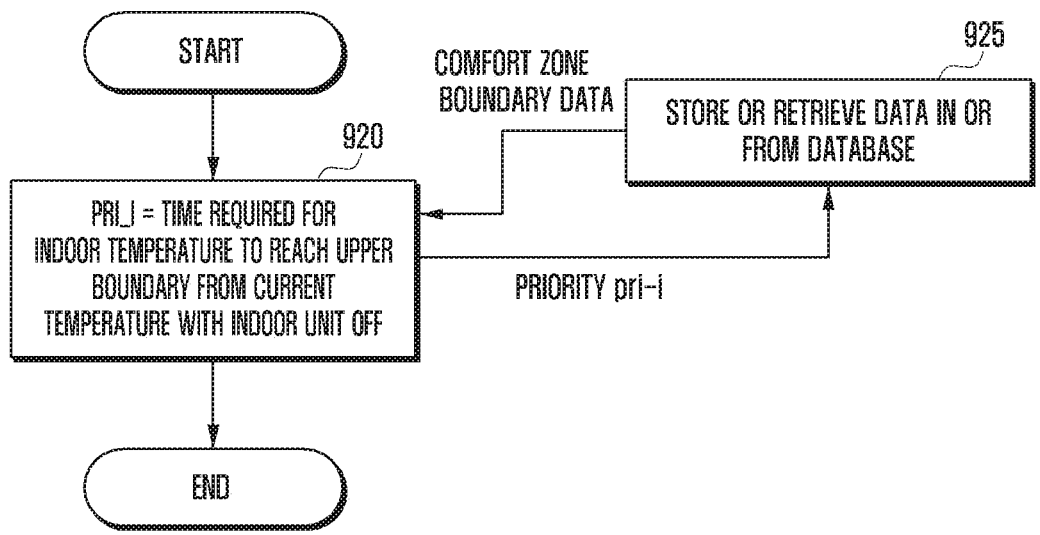
FIG. 9E illustrates a method of calculating the priority using the second scheme for cooling.

FIG. 9E illustrates a method of calculating the priority using the second scheme for cooling. With reference to FIG. 9E, the priority pri_i is calculated as the time required for the indoor temperature to reach the upper boundary temperature from the current temperature when the indoor unit is not operated (920). Here, the comfort zone boundary data is retrieved from the database and is used for the calculation, and the calculated priority pri_i is stored in the database (925).

Figure 9F:
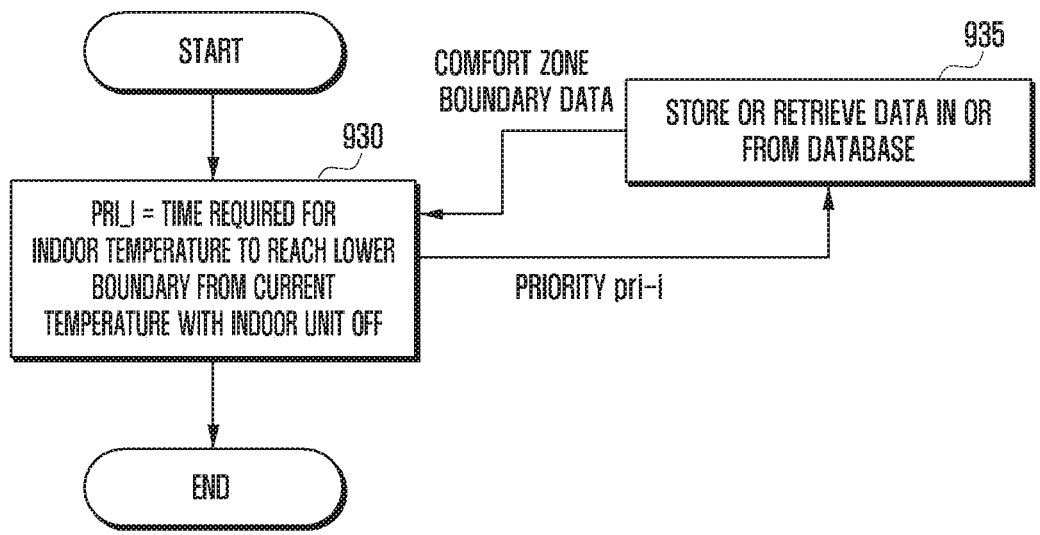
FIG. 9F illustrates a method of calculating the priority using the second scheme for heating.

FIG. 9F illustrates a method of calculating the priority using the second scheme for heating. With reference to FIG. 9F, the priority pri_i is calculated as the time required for the indoor temperature to reach the lower boundary temperature from the current temperature when the indoor unit is not operated (930). Here, the comfort zone boundary data is retrieved from the database and is used for the calculation, and the calculated priority pri_i is stored in the database (935).

As a third scheme for priority calculation, a description is given of calculating the priority based on the time when the indoor temperature is maintained in the comfort zone. This scheme calculates the priority using the ratio of the time when the interior space is kept comfortable, making sure that the individual interior spaces are kept at a similar level of comfort.

Figure 10A:
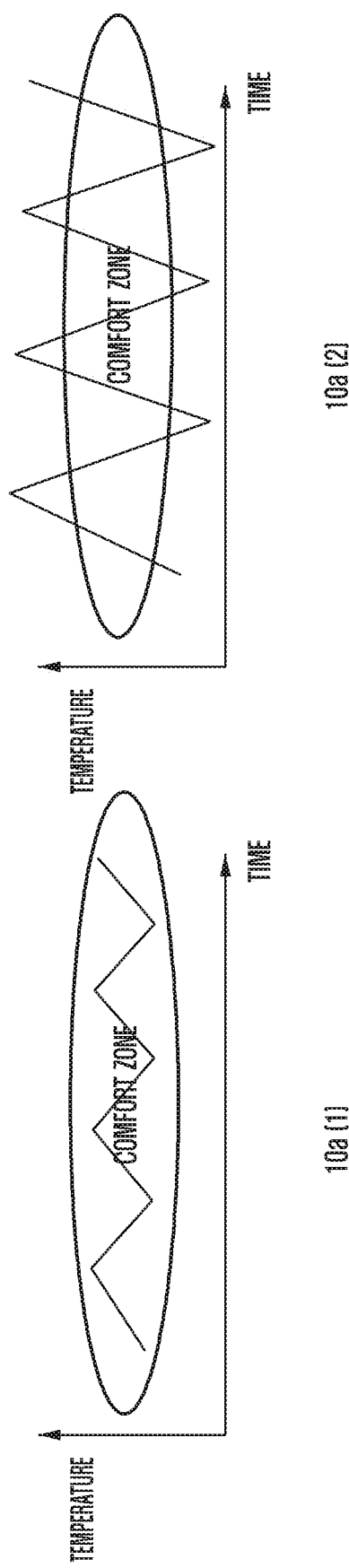
FIG. 10A depicts the degree of comfort maintained in a specific interior space.

FIG. 10A depicts the degree of comfort maintained in a specific interior space. In part (1) of FIG. 10A, the indoor temperature has changed with time but it changed within the comfort zone, which corresponds to a case where a level of comfort is maintained and the priority is low. In part (2), the indoor temperature has change with time and deviated from the comfort zone, which corresponds to a case where the priority is high because there is a considerable proportion of time when a certain level of comfort is not maintained.

Figure 10B:
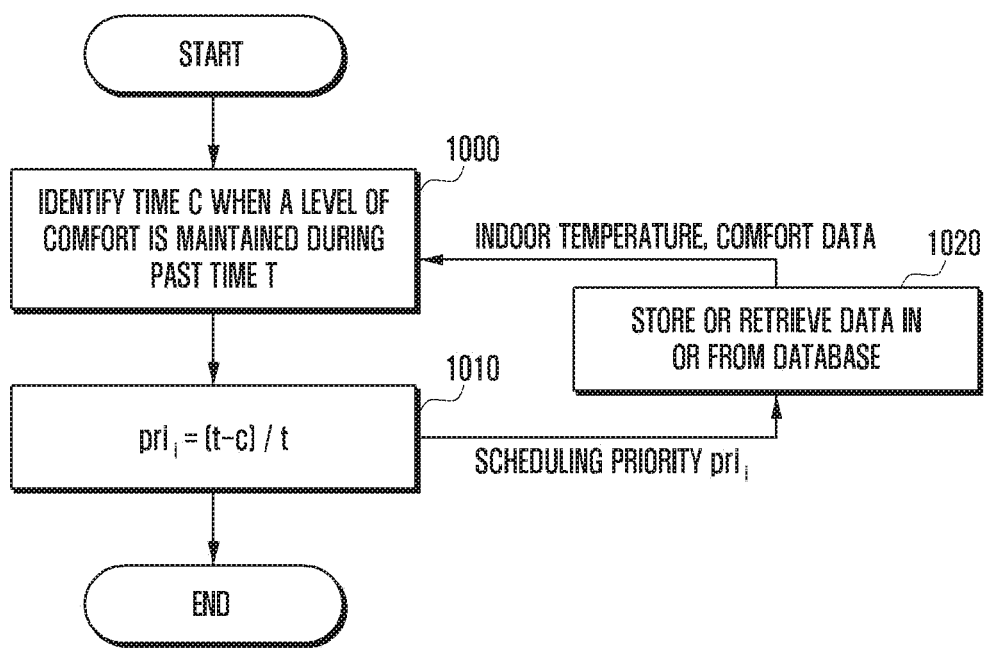
FIG. 10B illustrates a method of calculating the priority based on the duration in which the indoor temperature is maintained in the comfort zone.

FIG. 10B illustrates a method of calculating the priority based on the duration in which the indoor temperature is maintained in the comfort zone. With reference to FIG. 10B, the controller identifies the time c when a certain level of comfort is maintained during the past t time (1000). This is identified based on the indoor temperature and comfort data with time stored in the database (1020). Thereafter, the controller calculates the scheduling priority $pri_i$ by using (t−c)/t (1010). Here, if the $i^{th}$ space has remained in the comfort zone over time t, c becomes t and its priority value is zero. On the other hand, if the $i^{th}$ space is not in the comfort zone for time t, c becomes 0 and its priority value becomes 1. That is, the longer the time that a given level of comfort is not maintained, the larger the calculated priority value becomes. The controller stores the priority value calculated at step 1010 in the database (1020). Here, the observation time t is set in advance and may be changed depending on the situation.

As a fourth scheme for priority calculation, a description is given of calculating the priority based on the thermal efficiency of the space. In this scheme, an interior space having a high thermal efficiency is first cooled or heated. Hence, the thermal efficiency of the overall building is increased, thereby reducing energy consumption. The fact that the thermal efficiency of a specific space is high means that the time taken for the indoor temperature to change by a reference temperature is longer than that for another space, which means that the heating or cooling effect can be maintained for a long time.

Figure 10C:
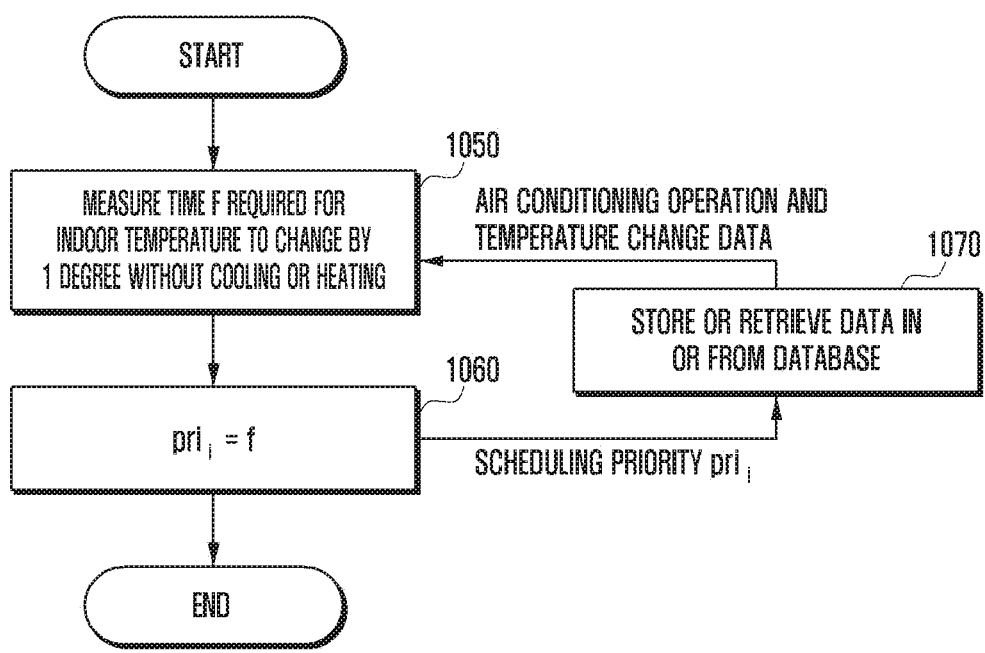
FIG. 10C illustrates a method of calculating the priority based on the spatial thermal efficiency.

FIG. 10C illustrates a method of calculating the priority based on the spatial thermal efficiency. With reference to FIG. 10C, for the $i^{th}$ space, the controller calculates the time f required for the indoor temperature to change by 1 degree in the absence of cooling or heating (1050). This is calculated based on the indoor temperature and air conditioning operation data stored in the database (1070). Thereafter, the controller sets the priority $pri_i$ to the value of f ($pri_i$=f) (1060). The controller stores the priority value calculated at step 1060 in the database (1070).

Fifth, a description is given of a method for scheduling the indoor units in an optimal way. The controller changes the air conditioning operation cycle of the indoor units so that the outdoor unit can operate in the high efficiency range. To this end, the controller checks whether each space remains in the comfort zone, identifies the indoor units that can be used for scheduling, and attempts to operate the indoor units and the outdoor unit as efficiently as possible in a given situation.

Figure 11:
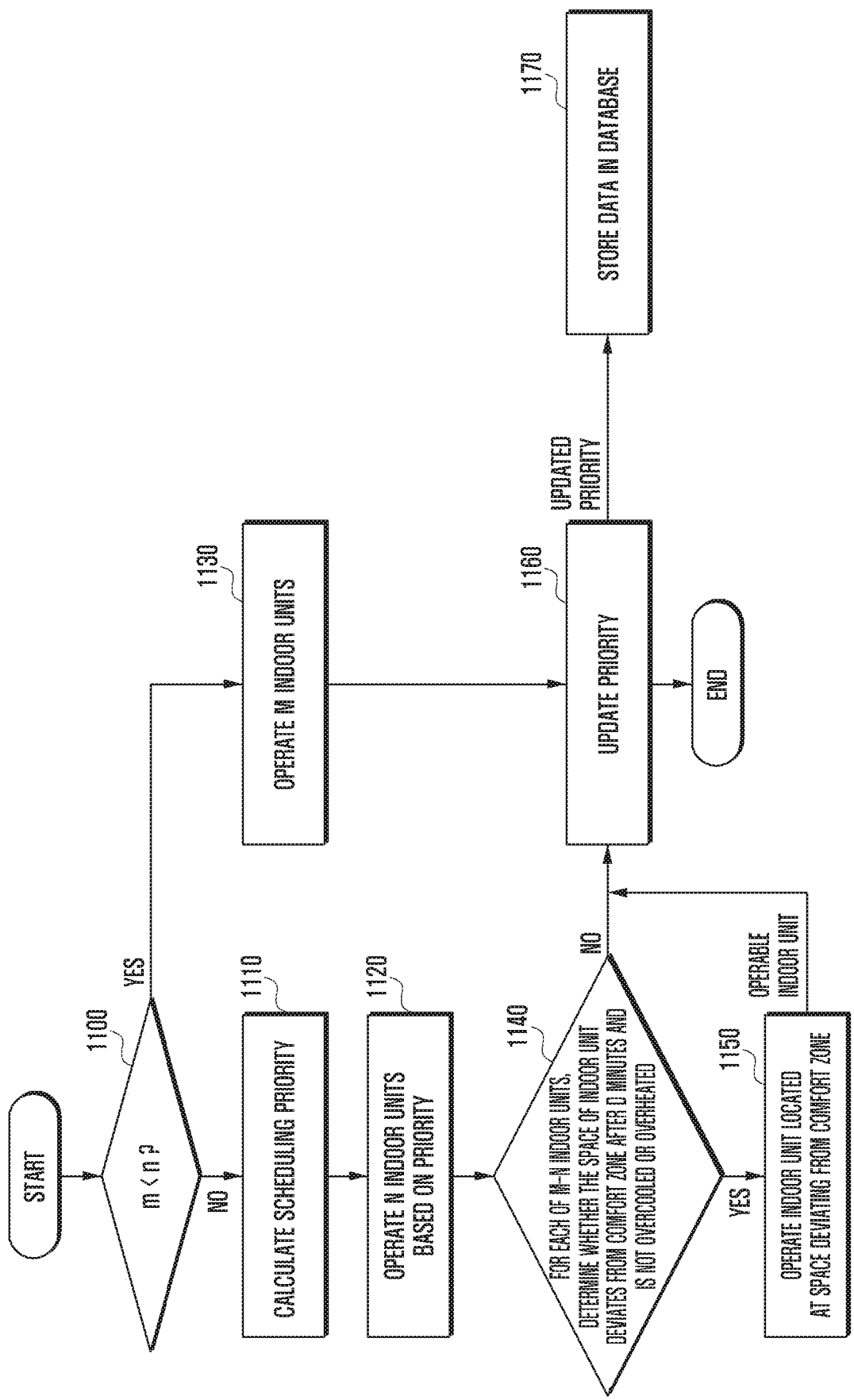
FIG. 11 illustrates a method for scheduling the indoor units.

FIG. 11 illustrates a method for scheduling the indoor units. With reference to FIG. 11, the controller compares m (the number of operable indoor units) with n (the number of indoor units corresponding to the high efficiency range of the outdoor unit (1100). If n is greater than m, the controller operates all m indoor units (1130). Thereafter, for each interior space, the controller recalculates and updates the priority of the indoor unit located at the space (1160), and stores the updated priority in the database (1170).

If n is less than or equal to m, the controller calculates the priority of each indoor unit (1110), and selects n indoor units in descending order of priority based on the calculated priorities and operates the selected indoor units (1120). Here, the controller can select n indoor units using only one of the two criteria for priority calculation described before, and can also select n indoor units using both of the two criteria. Thereafter, for each of m–n indoor units (i.e., operable but unselected indoor units), the controller determines whether the space where the indoor unit is located deviates from the comfort zone after the delay time d and is not in the overcooling or overheating state (1140). If there is a space deviating from the comfort zone after the delay time d, the controller operates the indoor unit located at the space (1150) and updates the priority of the indoor unit (1160). If there is no space deviating from the comfort zone after the delay time d, the controller updates the priority of the indoor unit (1160). The controller updates the priority of the indoor units and stores the updated priority in the database (1170).

Sixth, a description is given of a method for updating the priority of an indoor unit after operating the indoor unit.

If the priority is calculated based on the distance (temperature difference) between the current temperature and the boundary of the comfort zone (first scheme for priority calculation), there is no need for separate priority updating.

Figure 12A:
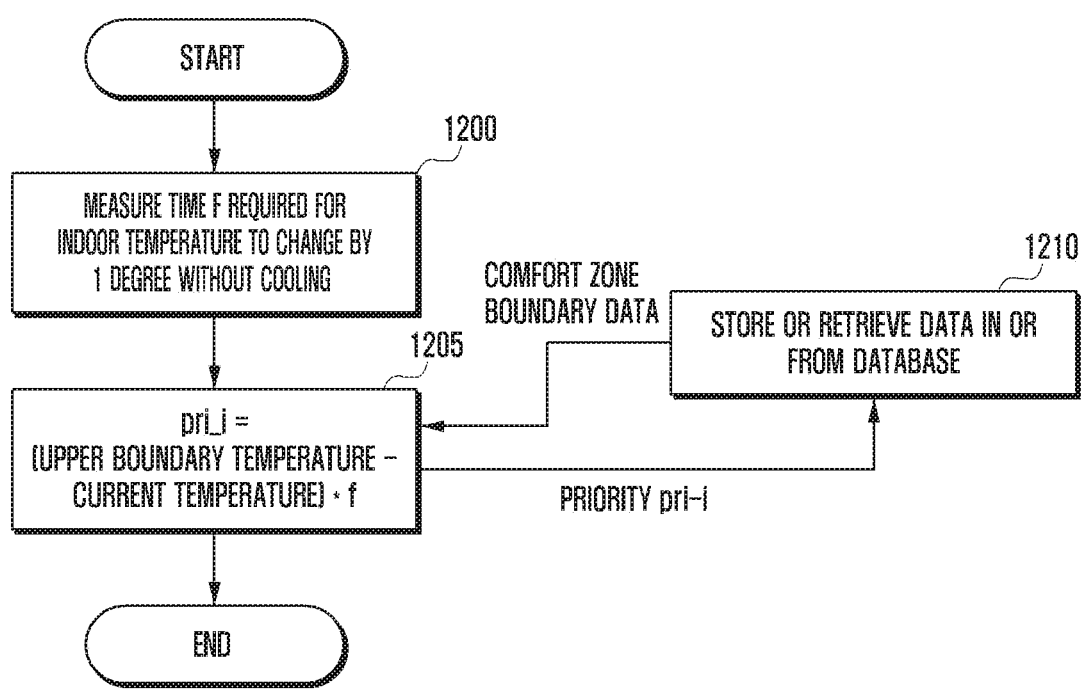
FIG. 12A illustrates a method of updating the priority when the indoor unit performs cooling.

A description is given of a method of priority updating when the priority is calculated based on the time taken for the indoor temperature to change from the current temperature to the boundary of the comfort zone while not operating the indoor unit (second scheme for priority calculation). FIG. 12A illustrates a method of updating the priority when the indoor unit performs cooling. With reference to FIG. 12A, the time f required for the indoor temperature to change by one degree is measured without cooling operation (1200). Here, the comfort zone boundary data stored in the database can be retrieved and used (1210). Thereafter, the priority pri_i is calculated by using (temperature at the upper boundary of the comfort zone−current temperature)*f (1215). Then, the calculated priority pri_i is stored in the database (1210).

Figure 12B:
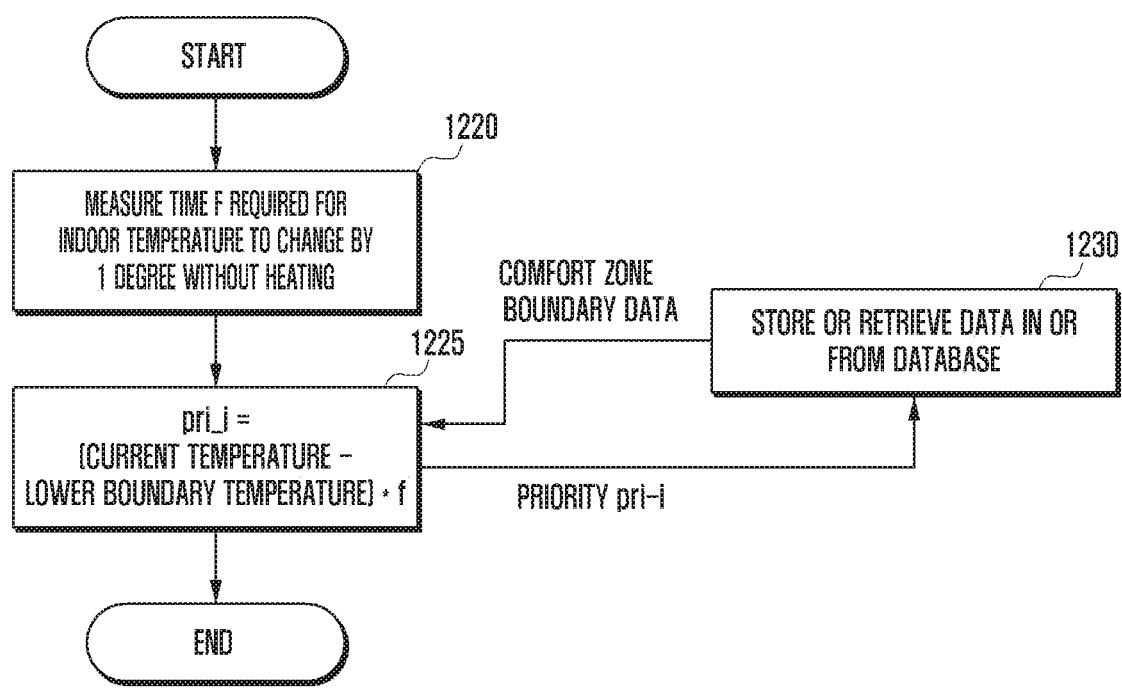
FIG. 12B illustrates a method of updating the priority when the indoor unit performs heating.

FIG. 12B illustrates a method of updating the priority when the indoor unit performs heating. With reference to FIG. 12B, the time f required for the indoor temperature to change by one degree is measured without heating operation (1220). Here, the comfort zone boundary data stored in the database can be retrieved and used (1230). Thereafter, the priority pri_i is calculated by using (current temperature−temperature at the lower boundary of the comfort zone)*f (1225). Then, the calculated priority pri_i is stored in the database (1230).

Figure 12C:
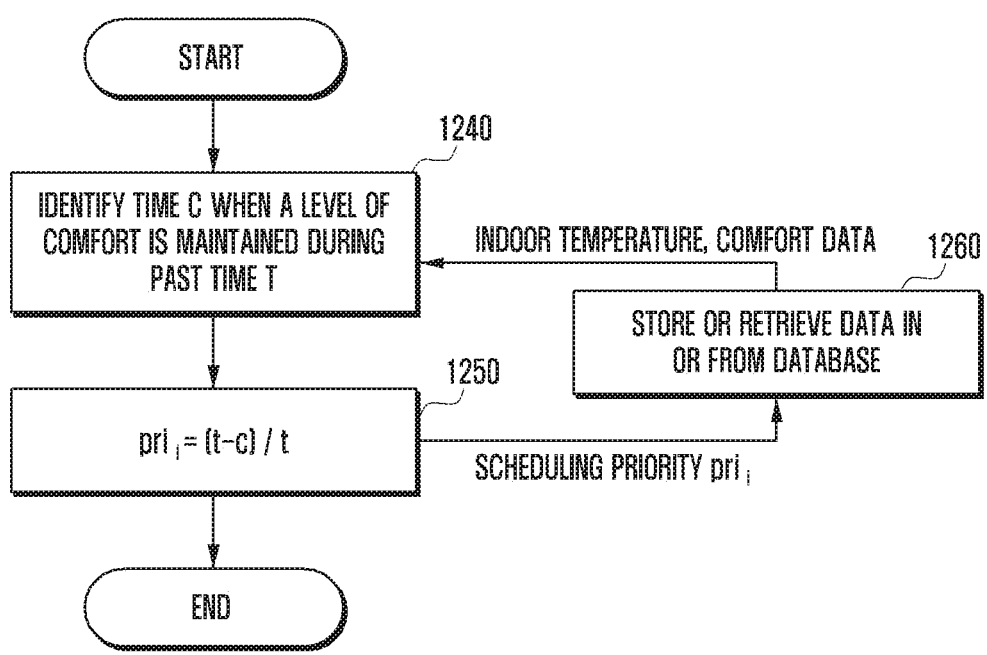
FIG. 12C illustrates a method of calculating and updating the priority based on the duration in which the indoor temperature is maintained in the comfort zone in relation to a third scheme for priority calculation.

FIG. 12C illustrates a method of calculating and updating the priority based on the duration in which the indoor temperature is maintained in the comfort zone (third scheme for priority calculation). The procedure of FIG. 12C is the same as the procedure of FIG. 10B, except that the priority ranking reflects the effect of operating the indoor unit since the priority is calculated after the indoor unit is operated.

Figure 13:
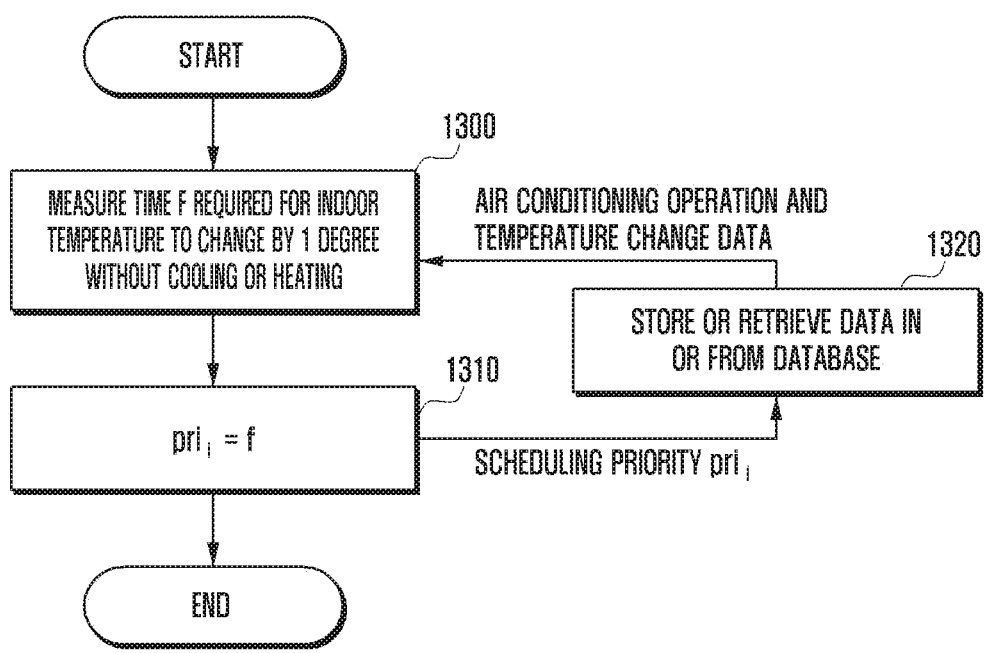
FIG. 13 illustrates a method of calculating the priority based on the spatial thermal efficiency in relation to a fourth scheme for priority calculation.

FIG. 13 illustrates a method of calculating the priority based on the spatial thermal efficiency (fourth scheme for priority calculation). The procedure of FIG. 13 is the same as the procedure of FIG. 10C, except that the priority ranking reflects the effect of operating the indoor unit since the priority is calculated after the indoor unit is operated.

FIG. 14 illustrates the devices that may implement the present invention.

Figure 14A:
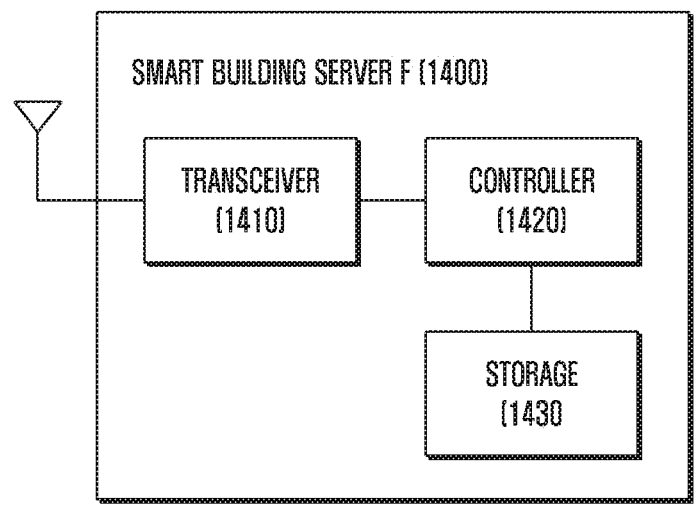
FIG. 14A is a block diagram of a smart building server.

FIG. 14A is a block diagram of a smart building server. With reference to FIG. 14A, the smart building server 1400 may include a transceiver 1410, a controller 1420, and a storage 1430. The transceiver 1420 can transmit and receive signals to and from a gateway or device acting as a gateway at each interior space. The transceiver 1420 may transmit information generated by the controller 1430 to each gateway or device and may receive various data from each gateway or device. The controller 1420 may control storing the data received through the transceiver 1420 in the database of the storage 1430. Based on the data stored in the database, the controller 1420 may identify the air conditioning operation time and operation cycle, calculate the number of indoor units to be operated in accordance with the high efficiency range of the outdoor unit, calculate the number of operable indoor units, calculate the priority, and determine the indoor unit to be operated based on the priority. The storage 1430 may store the data described above. The storage may be located with the smart building server or may be physically separated therefrom, but there is a connection relationship as shown in FIG. 14A.

Figure 14B:
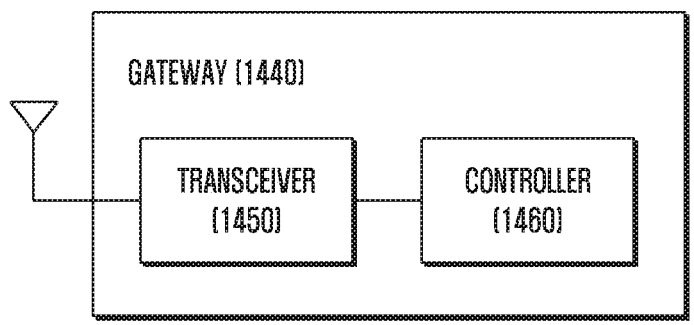
FIG. 14B is a block diagram of a gateway.

FIG. 14B is a block diagram of a gateway. With reference to FIG. 14B, the gateway 1440 located at each interior space may include a transceiver 1450 and a controller 1460. The transceiver 1450 can transmit and receive signals to and from a plurality of devices located in the corresponding interior space and the smart building server 1400. In particular, the transceiver can forward a command destined for a device received from the smart building server 1400 to the device, and can transmit various measurement data obtained by the plurality of devices to the smart building server 1400. The controller 1460 controls the transceiver to perform the operations described above.

Figure 14C:
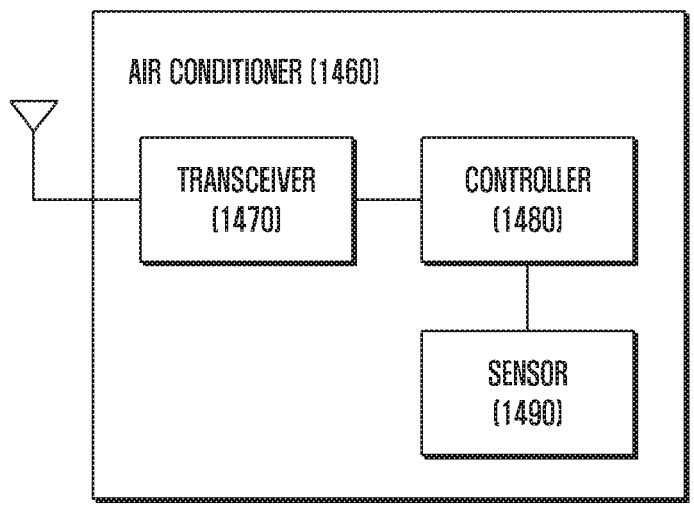
FIG. 14C is a block diagram of an air conditioner including indoor and outdoor units.

FIG. 14C is a block diagram of an air conditioner including indoor and outdoor units. With reference to FIG. 14C, the indoor unit or the outdoor unit may include a transceiver 1470, a controller 1480, and a sensor 1490. Although not shown, a storage capable of storing data can also be a component. The transceiver 1470 can receive a control signal from the gateway 1440 and transmit a signal containing data measured by the sensor 1490. The sensor 1490 can measure the indoor temperature, the outdoor temperature, and the like. The controller 1480 controls the transceiver 1470 and the sensor 1490 to perform their operations described above.

According to the present invention, it is possible to operate the indoor units and the outdoor unit in a highly energy efficient way by operating the indoor units according to the situation and the high efficiency range of the outdoor unit.

The invention claimed is:

1. A method for controlling a plurality of indoor units, the method comprising:
 identifying, using at least one processor of a control device, first information of first indoor units among the plurality of indoor units based on energy consumption of an outdoor unit connected with the plurality of indoor units;
 determining, using the at least one processor of the control device, a number of first indoor units based on the first information;
 identifying, using the at least one processor of the control device, second information of second indoor units among the plurality of indoor units based on a preset comfort zone;
 determining, using the at least one processor of the control device, a number of second indoor units based on the second information;
 calculating, using the at least one processor of the control device, priorities of the second indoor units based on the number of the second indoor units greater than the number of the first indoor units; and
 operating, using the at least one processor of the control device, at least one indoor unit among the second indoor units based on the calculated priorities.

2. The method of claim 1, further comprising operating all the second indoor units based on the first information and the second information if the number of the second indoor units is less than or equal to the number of the first indoor units.

3. The method of claim 1, further comprising:
 recalculating the priorities of the second indoor units after the at least one indoor unit is operated; and
 operating, if the priorities of the second indoor units are changed as a result of priority recalculation, at least one indoor unit among the second indoor units based on the recalculated priorities.

4. The method of claim 1, wherein a priority of a second indoor unit located in a specific interior space is calculated based on a ratio of a time during which an indoor temperature of the interior space is maintained between a preset first temperature and a preset second temperature to a given measurement time duration.

5. The method of claim 1, wherein a priority of a second indoor unit located in a specific interior space is calculated based on a thermal efficiency of the interior space.

6. The method of claim 1, wherein identifying second information of second indoor units comprises determining that a specific indoor unit located in an interior space is one of the second indoor units if an indoor temperature of the interior space does not deviate from a comfort zone between a preset first temperature or a preset second temperature after a preset delay time.

7. The method of claim 1, wherein the number of the first indoor units is determined based on energy consumption of the outdoor unit relative to an indoor temperature change rate calculated at a specific outdoor air temperature.

8. The method of claim 1, further comprising storing an air conditioning operation time and indoor temperature data of each interior space.

9. The method of claim 1,
wherein the number of the first indoor units is a number of indoor units to be operated, and
wherein the number of the second indoor units is a number of operable indoor units.

10. A control device capable of controlling a plurality of indoor units, comprising:
a transceiver configured to transmit and receive a control signal and measurement data;
at least one processor configured to:
identify first information of first indoor units among the plurality of indoor units based on energy consumption of an outdoor unit connected with the plurality of indoor units,
determine a number of the first indoor units based on the first information,
identify second information of second indoor units among the plurality of indoor units based on a preset comfort zone,
determine a number of the second indoor units based on the second information,
calculate, priorities of the second indoor units based on the number of the second indoor units greater than the number of the first indoor units, and
operate at least one indoor unit among the second indoor units based on the calculated priorities; and
a storage configured to store the measurement data and the priorities.

11. The control device of claim 10, wherein the at least one processor is further configured to control operating all the second indoor units based on the first information and the second information if the number of the second indoor units is less than or equal to the number of the first indoor units.

12. The control device of claim 10, wherein the at least one processor is further configured to control recalculating the priorities of the second indoor units after the at least one indoor unit is operated, and operating, if the priorities of the second indoor units are changed as a result of priority recalculation, at least one indoor unit among the second indoor units based on the recalculated priorities.

13. The control device of claim 10, wherein a priority of a second indoor unit located in a specific interior space is calculated based on a ratio of a time during which an indoor temperature of the interior space is maintained between a preset first temperature and a preset second temperature to a given measurement time duration.

14. The control device of claim 10, wherein a priority of a second indoor unit located in a specific interior space is calculated based on a thermal efficiency of the interior space.

15. The control device of claim 10, wherein the at least one processor is further configured to control determining that a specific indoor unit located in an interior space is one of the second indoor units if an indoor temperature of the interior space does not deviate from a comfort zone between a preset first temperature or a preset second temperature after a preset delay time.

16. The control device of claim 10, wherein the number of the first indoor units is determined based on energy consumption of the outdoor unit relative to an indoor temperature change rate calculated at a specific outdoor air temperature.

17. The control device of claim 10,
wherein the number of the first indoor units is a number of indoor units to be operated, and
wherein the number of the second indoor units is a number of operable indoor units.

* * * * *